(12) United States Patent
Uniyal

(10) Patent No.: US 12,323,839 B2
(45) Date of Patent: Jun. 3, 2025

(54) DYNAMIC SWITCHING BETWEEN UPLINK WAVEFORMS IN A 5TH GENERATION (5G) RADIO ACCESS NETWORK

(71) Applicant: DISH Wireless L.L.C., Englewood, CO (US)

(72) Inventor: Manish Uniyal, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 336 days.

(21) Appl. No.: 17/823,874

(22) Filed: Aug. 31, 2022

(65) Prior Publication Data

US 2024/0073726 A1 Feb. 29, 2024

(51) Int. Cl.
  *H04W 24/10* (2009.01)
  *H04B 17/318* (2015.01)

(52) U.S. Cl.
  CPC .......... *H04W 24/10* (2013.01); *H04B 17/318* (2015.01)

(58) Field of Classification Search
  None
  See application file for complete search history.

(56) References Cited

U.S. PATENT DOCUMENTS

| | | | | |
|---|---|---|---|---|
| 10,523,358 B1* | 12/2019 | Park | ...................... | H04B 7/0686 |
| 2010/0208604 A1* | 8/2010 | Kazmi | .................. | H04W 36/24 |
| | | | | 455/436 |
| 2015/0271755 A1* | 9/2015 | Karri | ................. | H04W 28/0221 |
| | | | | 370/252 |
| 2018/0139030 A1* | 5/2018 | Kim | ...................... | H04L 5/0053 |
| 2019/0394012 A1* | 12/2019 | Kim | ..................... | H04W 72/044 |
| 2020/0015097 A1* | 1/2020 | Kazmi | ..................... | H04W 4/70 |
| 2020/0163142 A1* | 5/2020 | Ryoo | ..................... | H04W 76/15 |
| 2020/0351883 A1* | 11/2020 | Wu | ................... | H04W 72/0466 |

(Continued)

FOREIGN PATENT DOCUMENTS

WO WO-2021047973 A1 * 3/2021 .......... H04B 7/0404
WO    2021084333 A1    5/2021

OTHER PUBLICATIONS

International Search Report and Written Opinion corresponding to PCT/US2023/029290, dated Nov. 17, 2023, 13 pages.

(Continued)

*Primary Examiner* — Faiyazkhan Ghafoerkhan
(74) *Attorney, Agent, or Firm* — Baker Botts L.L.P.

(57) ABSTRACT

A base station includes a memory that stores a threshold downlink signal strength and a processor coupled to the memory and configured to monitor a plurality of measurement reports from a user equipment (UE), wherein each measurement report includes a measured downlink signal strength of a downlink signal received at the UE. The processor compares the measured downlink signal strength received in each measurement report to a threshold downlink signal strength. When each of the measured downlink signal strengths received in the measurement reports during a first time period equals or is below the threshold downlink signal strength, the processor configures the UE to transmit using a first waveform. When each of the measured downlink signal strengths received in the measurement reports during a second time period exceeds the threshold downlink signal strength, the processor configures the UE to transmit using a second waveform.

14 Claims, 4 Drawing Sheets

(56) References Cited

U.S. PATENT DOCUMENTS

| | | | | |
|---|---|---|---|---|
| 2021/0036743 | A1* | 2/2021 | Bai | H04B 17/24 |
| 2021/0051707 | A1* | 2/2021 | Rastegardoost | H04W 72/23 |
| 2022/0007205 | A1* | 1/2022 | Kazmi | H04W 16/26 |
| 2022/0345284 | A1* | 10/2022 | Kim | H04L 5/0098 |
| 2022/0376965 | A1* | 11/2022 | Ramirez-Gutierrez | H04L 27/2602 |
| 2023/0069881 | A1* | 3/2023 | Rastegardoost | H04L 5/10 |
| 2024/0007963 | A1* | 1/2024 | Ng Molina | H04W 52/24 |
| 2024/0073726 | A1* | 2/2024 | Uniyal | H04W 24/10 |

OTHER PUBLICATIONS

3GPP TS 38.521-1 V15.1.0 (Dec. 2018).
Cho, Li; Kuo, Yu-Ming; Wu, Yi-Shin; Hsu, Chau-Yun; Polynomial Cancellation Coded DFT-s-OFDM for Low-PAPR Uplink Signaling; Electronics 2019, 8, 1349, pp. 1-17, Published Nov. 14, 2019.

\* cited by examiner

DYNAMIC SWITCHING BETWEEN UPLINK WAVEFORMS IN A 5TH GENERATION (5G) RADIO ACCESS NETWORK

TECHNICAL FIELD

The present disclosure relates generally to wireless communications, and more specifically to dynamic switching between uplink waveforms in a 5$^{th}$ Generation (5G) Radio Access Network (RAN).

BACKGROUND

Data throughput between a base station and user equipment (UE) depends on the quality of connection between the base station and the UE. The quality of connection between the base station and the UE generally depends on how close the UE is to the base station within a coverage area of the base station. Generally, the quality of connection is better when the UE is closer to the base station and deteriorates as the UE moves away from the base station. It is challenging to maintain a reliable connection between the UE and the base station when the UE is at cell edge where the signal strength of downlink signals from the base station is relatively weaker.

SUMMARY

The system and methods implemented by the system as disclosed in the present disclosure provide improved connectivity between a base station and a UE under varied radio conditions. The disclosed system and methods provide several practical applications and technical advantages. For example, the disclosed system provides the practical application of dynamic switching between uplink waveforms used by a UE to perform uplink transmissions such that an improved uplink waveform is used for a given radio condition. For example, embodiments of the present disclosure describe techniques for dynamically switching between the CP-OFDM waveform and the DFT-s-OFDM waveform for performing uplink transmissions by a UE depending on a quality of a downlink transmission received at the UE from a base station tower. The disclosed techniques allow a UE to dynamically adapt the waveform used for uplink transmissions by switching between the CP-OFDM waveform and the DFT-s-OFDM waveform based on the quality of downlink transmission received at the UE, to achieve an improved user experience for a given radio condition.

As described in embodiments of the present disclosure, a base station controller of a base station is configured to dynamically switch the UE between transmitting using the CP-OFDM waveform and the DFT-s-OFDM waveform based on measurement reports received from the UE. For example, the base station controller configures the UE to transmit on the uplink using the CP-OFDM waveform or the DFT-s-OFDM waveform based on the downlink signal strength measured at the UE. The base station controller monitors the measurement reports received from the UE and compares the measured downlink signal strength received in each measurement report to a threshold downlink signal strength. Base station controller determines whether the UE is to use the CP-OFDM waveform or the DFT-s-OFDM waveform based on a result of the comparison. For example, when the downlink signal strength received in a measurement report exceeds the threshold downlink signal strength, the base station controller configures the UE to transmit using the CP-OFDM waveform. On the other hand, when the measured downlink signal strength received in a measurement report equals or is below the threshold downlink signal strength, the base station controller configures the UE to transmit using the DFT-s-OFDM waveform. The threshold downlink signal strength is set to a value (or range of values) that improves data throughput when the UE is in good coverage areas of the base station and achieves reliable uplink connection when the UE is in areas with limited link budget (e.g., at or near cell edge). Using the CP-OFDM waveform allows the UE to take advantage of being in good coverage and improve data throughput. Using the DFT-s-OFDM waveform allows the UE to establish a reliable and stable connection with the base station in the limited link budget conditions at the cell edge.

Thus, the system and methods disclosed in the present disclosure allow a UE to better communicate with the base station for a given radio condition. This improves user experience especially by avoiding sub-standard quality of connection and connection drops at cell edge, and generally improves the 5G RAN technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
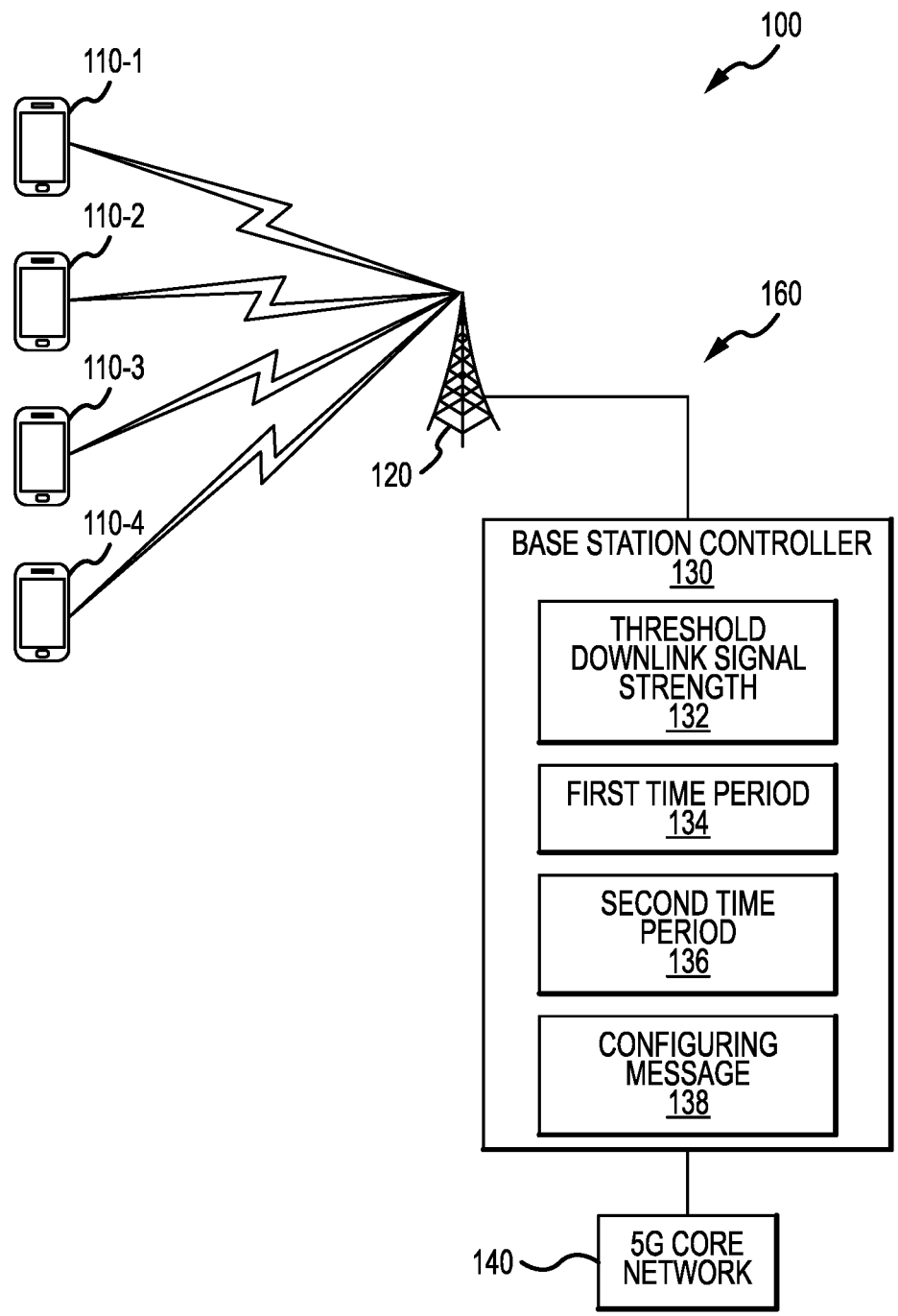
FIG. 1 illustrates an example of a cellular communication system, in accordance with embodiments of the present disclosure.

FIG. 1 illustrates an example of a cellular communication system 100, in accordance with embodiments of the present disclosure. As shown in FIG. 1, cellular communication system 100 may include multiple instances of user equipment (UE) 110 (shown as UE 110-1, 110-2, 110-3 and 110-4), base station tower 120, base station controller 130, and 5G core network 140. Collectively, base station tower 120 and base station controller 130 may be referred to as a base station 160. In the context of 5$^{th}$ Generation (5G) New Radio (NR), base station 160 may be referred to as a gNodeB or gNB. It may be noted that the terms "base station" and "gNodeB" are used interchangeably throughout this disclosure. Further, the terms "base station tower" and "base station" are interchangeably used throughout this disclosure. Base station 160 may provide each UE 110 access to the 5G core network 140. For example, base station 160 may be part of a cellular network, such as a 5G NR cellular network. In this context, base station 160 may be a gNodeB. Base station 160 may serve a particular geographical area, with other base stations serving neighboring geographical areas that at least partially overlap. Services provided by the cellular network can include network access (e.g., Internet access), data reporting, telephone calls, text messaging services, etc. Such services may generally rely on packetized data being exchanged between the UE 110 and the base station 160.

While cellular communication system 100 is described in the context of a 5G NR radio network that uses gNodeBs as base stations, the embodiments detailed herein can be applicable to other types of cellular networks, such as a 4G Long Term Evolution (LTE) cellular network, that uses eNodeBs in place of gNodeBs. In one or more embodiments, cellular communication system 100 operates according to the 5G NR radio access technology (RAT). In other embodiments, a different RAT may be used, such as 3G, 4G Long Term Evolution (LTE), or some other RAT. In some other embodiments, the 5G network may use a 5G core. In some embodiments, a 5G network may use an evolved packet core (EPC) instead of or in addition to the 5G core. Communications from base station tower 120 to UE 110 may be scheduled. Various physical resource blocks (PRBs) may be available across multiple component carriers (CCs) of a carrier aggregation (CA) for communication. Each PRB may define a timeslot on a particular frequency within a CC. The number of PRBs available on a given CC is dependent on the bandwidth of the CC and the subcarrier spacing of the CC.

UEs 110 can be various forms of wireless devices that are capable of communication according to the RAT of cellular communication system 100. For instance, UEs 110 can be smartphones, wireless modems, cellular phones, laptop computers, wireless access points (APs), etc.

5G NR may support several waveforms for uplink transmissions from a UE 110 to a base station tower 120. For example, in accordance with 3GPP standards (e.g., 3GPP TS 38.300), an uplink transmission waveform may be a conventional Orthogonal Frequency Division Multiplexing (OFDM) waveform using cyclic prefix (CP), often referred to as CP-OFDM waveform. The conventional OFDM waveform using CP may have an additional transform precoding function that performs Digital Fourier Transform (DFT) spreading that can be enabled or disabled. This type of waveform is often referred to as a DFT-spread-OFDM or DFT-s-OFDM. Transform precoding is usually the first step to create the DFT-s-OFDM waveform. Transform precoding is used to spread uplink data in a special way to reduce PAPR (Peak-to-Average Power Ratio) of the waveform. Thus the UE 110 has the option of transmitting using the CP-OFDM waveform or the DFT-s-OFDM waveform. For example, the UE 110 may generate the DFT-s-OFDM waveform by performing the initial transform precoding step or may generate a CP-OFDM waveform by not performing the initial transform precoding step.

The CP-OFDM and the DFT-s-OFDM waveforms have differing characteristics. The CP-OFDM waveform is generally used in high throughput scenarios. CP-OFDM offers very high spectral packing efficiency in RBs (Resource blocks). It is employed when network operators need improved network capacity in dense urban environments. On the other hand, DFT-s-OFDM is used in power limited scenarios and offers less efficient spectral packing, and thus lesser throughput, as compared to CP-OFDM. The CP-OFDM waveform can be used for single-stream and multi-stream (i.e. MIMO) transmissions, while DFT-s-OFDM based waveform is limited to single stream transmissions that may be beneficial for scenarios with limited link budget. In addition, DFT-s-OFDM offers lower PAPR as compared to CP-OFDM. For example, while the PAPR with CP-OFDM may be 11 to 13 dB, DFT-s-OFDM may offer a PAPR of 6 to 9 dB. Thus, DFT-s-OFDM may offer better and more stable coverage as compared to CP-OFDM in low link budget scenarios, such as in the case of cell edge UEs.

Thus, it may be beneficial for a UE 110 to use the CP-OFDM waveform when in good radio coverage to improve throughput and use the DFT-s-OFDM waveform in limited link budget scenarios to improve the quality of connection and user experience, including when the UE is at a cell edge where the signal strength from the base station tower 120 may be relatively weaker. However, the 3GPP standards do not define usage of the CP-OFDM waveform and the DFT-s-OFDM waveform based on link budget associated with a downlink signal received at the UE.

Embodiments of the present disclosure describe techniques for dynamically switching between the CP-OFDM waveform and the DFT-s-OFDM waveform for performing uplink transmissions by a UE depending on a quality of a downlink transmission received at the UE from a base station tower. The disclosed techniques allow a UE to dynamically adapt the waveform used for uplink transmissions by switching between the CP-OFDM waveform and the DFT-s-OFDM waveform based on the quality of downlink transmission received at the UE, to achieve an improved user experience for a given radio condition.

The dynamic adaptation of the uplink waveform will now be described with reference to FIGS. 1 and 2.

Figure 2:
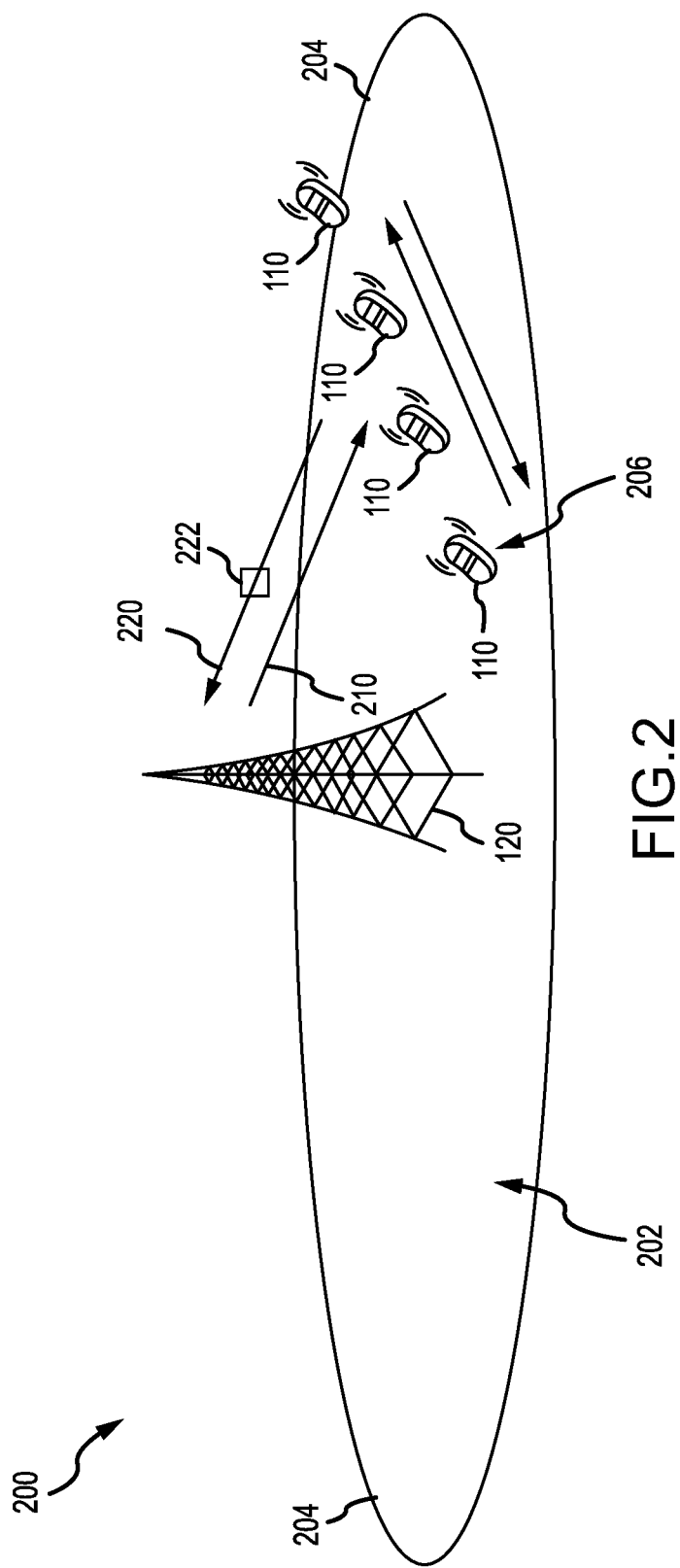
FIG. 2 illustrates an example of dynamic adaption of uplink waveform, in accordance with embodiments of the present disclosure.

FIG. 2 illustrates a system 200 that implements an example dynamic adaption of uplink waveform, in accordance with embodiments of the present disclosure. As shown in FIG. 2, base station tower 120 (e.g., belonging to a base station 160 as shown in FIG. 1) has a cell coverage area 202 within which the base station tower 120 can reliably serve UEs 110. Base station tower 120 transmits to UE 110 on the downlink 210 and the UE 110 transmits to the base station tower 120 on the uplink 220. A downlink signal strength of the downlink signal 210 received at the UE 110 from the base station tower 120 may differ depending on a position of UE 110 within the cell coverage area 202 of the base station tower 120. For example, the downlink signal strength of the downlink signal 210 as received at the UE 110 may be stronger when the UE 110 is at position 206 that is closer to the base station tower 120. The downlink signal strength of the downlink signal 210 may be relatively weaker when the UE 110 is at cell edge 204. Essentially, the downlink signal strength of the downlink signal 210 is stronger when the UE 110 is closer to the position of the base station tower 120 and diminishes as the UE 110 moves away from the base station tower 120. The cell edge 204 of the base station tower 120 generally represents a distance or a range of distances from the base station tower 120 within which the base station tower 120 can reliably service a UE 110. For example, when the UE 110 moves beyond the cell edge 204, the signal strength of the downlink signal 210 may drop below levels needed to maintain a reliable connection between the base station tower 120 and the UE 110.

UE 110 may be configured to measure the downlink signal strength of downlink signals 210 received from the base station tower 120 and send a measurement report 222 back to the base station 160 that includes the measured downlink signal strength of the downlink signal 210. A measurement report 222 transmitted by the UE 110 may include one or more of a Reference Signal Received Power (RSRP), a Reference Signal Received Quality (RSRQ) and Signal to Interference Noise Ratio (SINR). The UE 110 may be configured to transmit measurement reports 222 on the uplink periodically, in accordance with a pre-configured schedule and/or at preconfigured events. The downlink signals 210 measured by the UE 110 may include downlink reference signals (e.g., Channel State Information Reference Signal (CSI-RS)) transmitted by the base station 160.

Referring back to FIG. 1, the base station controller 130 of base station 160 may be configured to dynamically switch the UE 110 between transmitting using the CP-OFDM waveform and the DFT-s-OFDM waveform based on measurement reports 222 received from the UE 110. For example, the base station controller 130 may configure the UE 110 to transmit on the uplink 220 using the CP-OFDM waveform or the DFT-s-OFDM waveform based on the downlink signal strength measured at the UE 110. As described above, the UE 110 may be configured to transmit measurement reports 222 to the base station 160 in accordance with a preconfigured schedule (e.g., at preconfigured time intervals). In one or more embodiments, base station controller 130 may be configured to monitor the measurement reports 222 received from the UE 110 at the preconfigured time intervals and compare the measured downlink signal strength received in each measurement report 222 to a threshold downlink signal strength 132. The threshold downlink signal strength 132 may include one or more of a threshold RSRP, a threshold RSRQ and a threshold SINR. In one embodiment, the base station controller 130 may be configured to compare a measured RSRP received in a measurement report 222 with the threshold RSRP. In an additional or alternative embodiment, the base station controller 130 may be configured to compare a measured RSRQ received in a measurement report 222 with the threshold RSRQ. In an additional or alternative embodiment, the base station controller 130 may be configured to compare a measured SINR received in a measurement report 222 with the threshold SINR. Base station controller 130 may be configured to determine whether the UE is to use the CP-OFDM waveform or the DFT-s-OFDM waveform based on a result of the comparison. For example, when the downlink signal strength received in a measurement report 222 exceeds the threshold downlink signal strength 132, the base station controller 130 may configure the UE to transmit using the CP-OFDM waveform. On the other hand, when the measured downlink signal strength received in a measurement report 222 equals or is below the threshold downlink signal strength 132, the base station controller 130 may configure the UE to transmit using the DFT-s-OFDM waveform.

The threshold downlink signal strength 132 may be set to a value (or range of values) that improves data throughput when the UE 110 is in good coverage areas of the base station 160 and achieves reliable uplink connection when the UE 110 is in areas with limited link budget. In one embodiment, the threshold downlink signal strength 132 is set to a value that is within a selected range of values of a downlink signal strength expected at a cell edge 204 associated with the base station 160. For example, when the cell edge 204 of the base station 160 is defined to be within an RSRP range of −110 dBm and −113 dBm, the threshold RSRP may be set to −110 dBm. In this example, the base station controller may configure the UE 110 to use CP-OFDM when the measured RSRP >−110 dBm. The base station controller 130 may configure the UE 110 to use DFT-s-OFDM when the measured RSRP <−110 dBm. It may be noted that when the RSRP is a negative value, a higher negative value of the RSRP corresponds to a lower downlink signal strength. For example, an RSRP of −120 dBm corresponds to a lower downlink signal strength than an RSRP of −110 dBm. Thus, when the threshold is set at −110 dBm, the UE 110 may be configured to use DFT-s-OFDM when the measured RSRP equals −110 dBm or has a higher negative value (e.g., −111, −112, −113 . . . ). The UE 110 may be configured to use CP-OFDM when the RSRP has a lower negative value than −110 (e.g., −109, −108, −107 . . . ) or has a positive value.

In one or more embodiments, the base station controller 130 may be configured to switch to the DFT-s-OFDM waveform when the measured downlink signal strength stays below or equals the threshold downlink signal strength 132 for a pre-configured first time period 134. Similarly, the base station controller 130 may be configured to switch to the CP-OFDM waveform when the measured downlink signal strength stays above the threshold downlink signal strength 132 for a pre-configured second time period 136. In one embodiment, in response to receiving a measurement report 222 having the measured downlink signal strength that equals or is below the threshold downlink signal strength 132, base station controller 130 may start a first timer T1 set to the first time period 134 (e.g., 1000 ms). The base station controller 130 continues to monitor subsequent measurement reports 222 from the UE 110 and checks whether the measured downlink signal strengths received in the subsequent measurement reports 222 stays equal to or below the threshold downlink signal strength 132. If the measured downlink signal strength has stayed equal to or below the threshold downlink signal strength 132 when the first timer T1 expires, base station controller 130 configures the UE 110 to use the DFT-s-OFDM waveform. The first timer T1 is reset any time a measurement report 222 reports a measured downlink signal strength that exceeds the threshold downlink signal strength 132 and is restarted upon receiving a measurement report 222 that reports a measured downlink signal strength that equals or is below the threshold downlink signal strength 132. In an additional or alternative embodiment, in response to receiving a measurement report 222 having the measured downlink signal strength that exceeds the threshold downlink signal strength 132, base station controller 130 may start a second timer T2 set to the second time period 136 (e.g., 1000 ms). The length of the second timer T2 may be same as or different from the first timer T1. The base station controller 130 continues to monitor subsequent measurement reports 222 from the UE 110 and checks whether the measured downlink signal strengths received in the subsequent measurement reports 222 stays above the threshold downlink signal strength 132. If the measured downlink signal strength has stayed above the threshold downlink signal strength 132 when the second timer T2 expires, base station controller 130 configures the UE 110 to use the CP-OFDM waveform. The second timer T2 is reset any time a measurement report 222 reports a measured downlink signal strength that equals or is below the threshold downlink signal strength 132 and is restarted upon receiving a measurement report 222 that reports a measured downlink signal strength that exceeds the threshold downlink signal strength 132. The above procedure may avoid unnecessary switching between waveforms due to momentary errors in measuring the downlink signal 210 by the UE 110.

The base station controller 130 may configure the UE 110 to use the CP-OFDM waveform or the DFT-s-OFDM waveform by commanding the UE 110 to disable or enable respectively transform precoding when generating uplink transmissions to the base station 160. As described above, performing transform precoding of uplink transmissions generates the DFT-s-OFDM waveform and disabling the transform precoding step generates the CP-OFDM waveform. The base station controller 130 may command the UE 110 to disable or enable transform precoding of uplink transmissions by transmitting a configuring message 138 to the UE 110. In one embodiment, the configuring message 138 may include a Radio Resource Control (RRC) message transmitted by the base station 160 to the UE 110. In one embodiment, to enable or disable transform precoding at the UE 110, base station controller 130 may use the transform-precoder field of a Physical Uplink Shared Channel-Config (PUSCH-Config) information element which is transmitted to the UE 110 as part of RRC signaling. For example, to configure the UE 110 to use the DFT-s-OFDM waveform, base station controller 130 may set the transform-precoder field to enabled. Upon receiving an RRC message in which the transform-precoder field of the PUSCH-Config information element is set to enabled, UE 110 starts applying transform precoding when generating subsequent uplink transmissions in order to generate the DFT-s-OFDM waveform. On the other hand to configure the UE 110 to use the CP-OFDM, base station controller 130 may set the transform-precoder field to disabled. Upon receiving an RRC message in which the transform-precoder field of the PUSCH-Config information element is set to disabled, UE 110 disables transform precoding when generating subsequent uplink transmissions in order to generate the CP-OFDM waveform.

In an additional or alternative embodiment, to enable or disable transform precoding at the UE 110, base station controller 130 may use msg3-transformPrecoder field of a Random Access Channel-ConfigCommon (RACH-Config-Common) information element which is transmitted to the UE 110 as part of RRC signaling. For example, to configure the UE 110 to use the DFT-s-OFDM waveform, base station controller 130 may set the msg3-transformPrecoder field of the RACH-ConfigCommon information element to enabled. Upon receiving an RRC message in which the msg3-transformPrecoder field of the RACH-ConfigCommon information element is set to enabled, UE 110 starts applying transform precoding when generating subsequent uplink transmissions in order to generate the DFT-s-OFDM waveform. On the other hand to configure the UE 110 to use CP-OFDM, base station controller 130 may set the msg3-transformPrecoder field of the RACH-ConfigCommon information element to disabled. Upon receiving an RRC message in which the msg3-transformPrecoder field of the RACH-ConfigCommon information element is set to disabled, UE 110 disables transform precoding when generating subsequent uplink transmissions in order to generate the CP-OFDM waveform.

Referring back to FIG. 2, an example switching between the CP-OFDM and the DFT-s-OFDM waveforms will now be described. In this example, UE 110 is initially powered-ON at position 206 near the base station tower 120 where the downlink signal strength (e.g., RSRP) of the downlink signal 210 is well above the threshold downlink signal strength 132 (e.g., threshold RSRP). Once the UE 110 established a connection with the base station tower 120, the UE 110 starts transmitting measurement reports 222 to the base station 160. When the UE reports to the base station 160 the RSRP of the downlink signal 210 as measured at position 206, the base station controller 130 detects that the measured RSRP exceeds the threshold RSRP and, in response, starts timer T1. When the RSRP stays above the threshold RSRP till timer T1 expires, base station controller 130 transmits a configuring message 138 (e.g., RRC message) to the UE 110 instructing the UE 110 to disable transform precoding at the UE 110. For example, the base station controller 130 may set the transform-precoder field of the PUSCH-Config information element to disable. In response to receiving the configuring message 138, the UE 110 disables transform precoding when generating uplink transmissions, thus using the CP-OFDM waveform. Using the CP-OFDM waveform allows the UE 110 to take advantage of being in good coverage and improve data throughput. As the UE 110 moves away from base station tower 120 (e.g., a user carrying the UE may walk or drive away from the base station tower 120), the downlink RSRP starts to dropping but may still hold above the threshold RSRP. As long as the RSRP is above the threshold RSRP the base station controller 130 keeps the transform-precoder field set to disabled allowing the UE 110 to continue using the CP-OFDM waveform. However, when the UE 110 reaches at or near the cell edge 204, the downlink RSRP may equal or drop below the threshold RSRP. When the base station 160 receives a measurement report 222 from the UE 110 in which the measured downlink RSRP equals or is below the threshold RSRP, base station controller 130 resets timer T1 and starts timer T2. If the downlink RSRP continues to stay equal to or holds below the threshold RSRP when timer T2 expires, base station controller 130 transmits a configuring message 138 (e.g., RRC message) to the UE 110 instructing the UE 110 to enable transform precoding at the UE 110. For example, the base station controller 130 may set the transform-precoder field of the PUSCH-Config information element to enable. In response to receiving the configuring message 138, the UE 110 enables transform precoding when generating uplink transmissions, thus using the DFT-s-OFDM waveform. Using the DFT-s-OFDM waveform allows the UE to establish a reliable and stable connection with the base station 160 in the limited link budget conditions at the cell edge 204.

Figure 3:
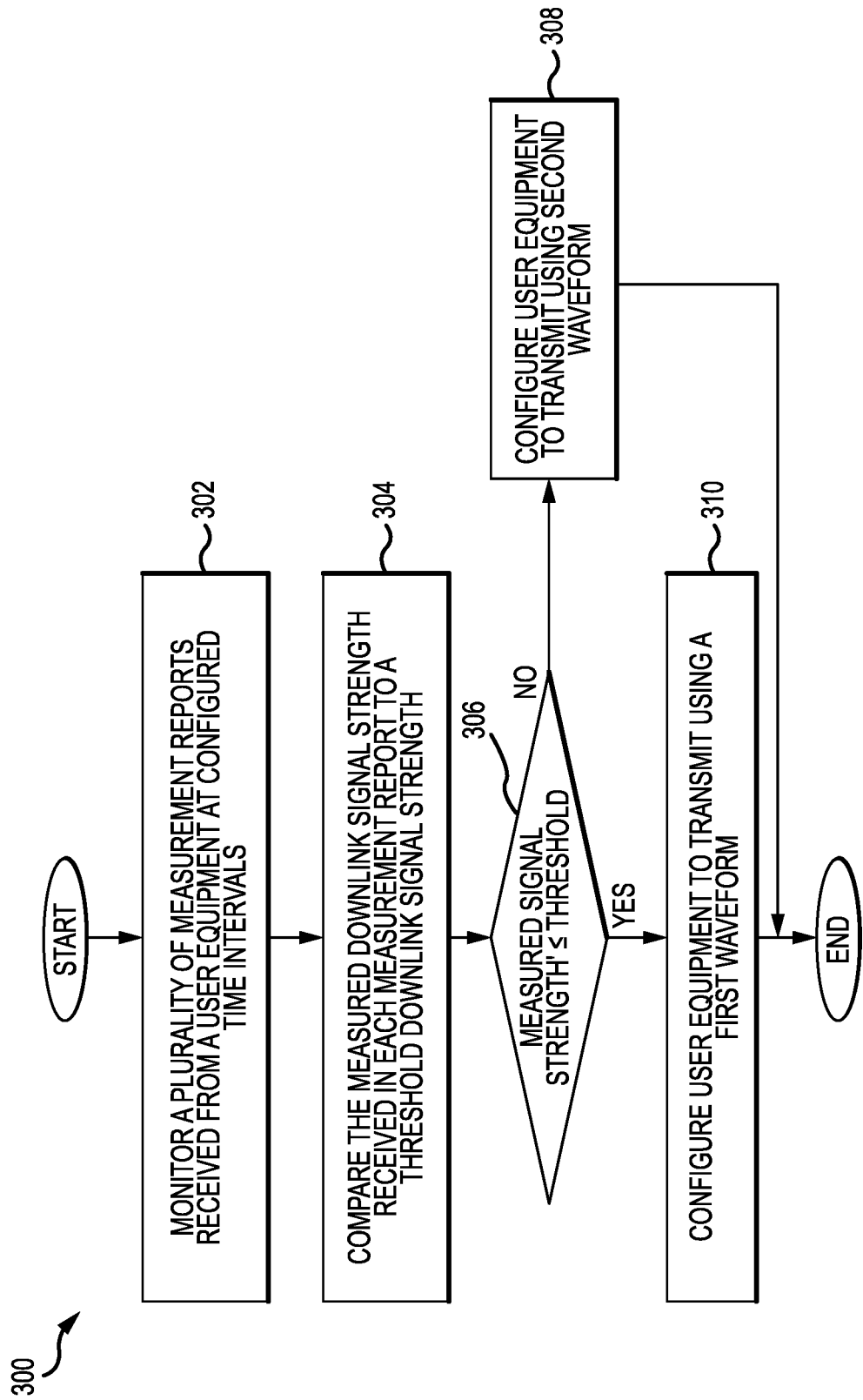
FIG. 3 is a flowchart of an example method for dynamically switching between uplink waveforms, in accordance with embodiments of the present disclosure.

FIG. 3 is a flowchart of an example method 300 for dynamically switching between uplink waveforms, in accordance with embodiments of the present disclosure. Method 300 may be performed by the base station controller 130 as shown in FIG. 1 and described above.

At operation 302, base station controller 130 monitors a plurality of measurement reports 222 received from a UE 110, wherein each measurement report 222 includes a measured downlink signal strength of a downlink signal 210 received at the UE 110.

As described above, UE 110 may be configured to measure the downlink signal strength of downlink signals 210 received from the base station tower 120 and send a measurement report 222 back to the base station 160 that includes the measured downlink signal strength of the downlink signal 210. A measurement report 222 transmitted by the UE 110 may include one or more of a Reference Signal Received Power (RSRP), a Reference Signal Received Quality (RSRQ) and Signal to Interference Noise Ratio (SINR). The UE 110 may be configured to transmit measurement reports 222 on the uplink periodically, in accordance with a pre-configured schedule and/or at pre-configured events. The downlink signals 210 measured by the UE 110 may include downlink reference signals (e.g., Channel State Information Reference Signal (CSI-RS)) transmitted by the base station 160.

At operation 304, base station controller 130 compares the measured downlink signal strength received in each measurement report to a threshold downlink signal strength 132.

As described above, the base station controller 130 of base station 160 may be configured to dynamically switch the UE 110 between transmitting using the CP-OFDM waveform and the DFT-s-OFDM waveform based on measurement reports 222 received from the UE 110. For example, the base station controller 130 may configure the UE 110 to transmit on the uplink 220 using the CP-OFDM waveform or the DFT-s-OFDM waveform based on the downlink signal strength measured at the UE 110. As described above, the UE 110 may be configured to transmit measurement reports 222 to the base station 160 in accordance with a preconfigured schedule (e.g., at preconfigured time intervals). In one or more embodiments, base station controller 130 may be configured to monitor the measurement reports 222 received from the UE 110 at the preconfigured time intervals and compare the measured downlink signal strength received in each measurement report 222 to a threshold downlink signal strength 132. The threshold downlink signal strength 132 may include one or more of a threshold RSRP, a threshold RSRQ and a threshold SINR. In one embodiment, the base station controller 130 may be configured to compare a measured RSRP received in a measurement report 222 with the threshold RSRP. In an additional or alternative embodiment, the base station controller 130 may be configured to compare a measured RSRQ received in a measurement report 222 with the threshold RSRQ. In an additional or alternative embodiment, the base station controller 130 may be configured to compare a measured SINR received in a measurement report 222 with the threshold SINR.

The threshold downlink signal strength 132 may be set to a value (or range of values) that improves data throughput when the UE 110 is in good coverage areas of the base station 160 and achieves reliable uplink connection when the UE 110 is in areas with limited link budget. In one embodiment, the threshold downlink signal strength 132 is set to a value that is within a selected range of values of a downlink signal strength expected at a cell edge 204 associated with the base station 160. For example, when the cell edge 204 of the base station 160 is defined to be within an RSRP range of −110 dBm and −113 dBm, the threshold RSRP may be set to −110 dBm. In this example, the base station controller may configure the UE 110 to use CP-OFDM when the measured RSRP >−110 dBm. The base station controller 130 may configure the UE 110 to use DFT-s-OFDM when the measured RSRP <−110 dBm. It may be noted that when the RSRP is a negative value, a higher negative value of the RSRP corresponds to a lower downlink signal strength. For example, an RSRP of −120 dBm corresponds to a lower downlink signal strength than an RSRP of −110 dBm. Thus, when the threshold is set at −110 dBm, the UE 110 may be configured to use DFT-s-OFDM when the measured RSRP equals −110 dBm or has a higher negative value (e.g., −111, −112, −113 . . . ). The UE 110 may be configured to use CP-OFDM when the RSRP has a lower negative value than −110 (e.g., −109, −108, −107 . . . ) or has a positive value.

At operation 306, base station controller determines whether the measured downlink signal strength received in one or more measurement reports 222 equals or is below the threshold downlink signal strength 132. If the measured downlink signal strength in one or more measurement reports 222 equals or is below the threshold downlink signal strength 132, method 300 proceeds to operation 310.

At operation 310, when each of the measured downlink signal strengths received in the measurement reports during a first time period 134 equals or is below the threshold downlink signal strength 132, the base station controller 130 configures the UE 110 to transmit using a first waveform (e.g., DFT-s-OFDM waveform).

If, at operation 306, the measured downlink signal strength in one or more measurement reports 222 exceeds the threshold downlink signal strength 132, method 300 proceeds to operation 308. At operation 308, when each of the measured downlink signal strengths received in the measurement reports during a second time period exceeds the threshold downlink signal strength, the base station controller 130 configures the UE 110 to transmit using a second waveform (e.g., CP-OFDM waveform).

As described above, base station controller 130 may be configured to determine whether the UE is to use the CP-OFDM waveform or the DFT-s-OFDM waveform based on a result of the comparison between the measured downlink signal strength received in one or more measurement reports 222 and the threshold downlink signal strength 132. For example, when the downlink signal strength received in a measurement report 222 exceeds the threshold downlink signal strength 132, the base station controller 130 may configure the UE to transmit using the CP-OFDM waveform. On the other hand, when the measured downlink signal strength received in a measurement report 222 equals or is below the threshold downlink signal strength 132, the base station controller 130 may configure the UE to transmit using the DFT-s-OFDM waveform.

In one or more embodiments, the base station controller 130 may be configured to switch to the DFT-s-OFDM waveform when the measured downlink signal strength stays below or equals the threshold downlink signal strength 132 for a pre-configured first time period 134. Similarly, the base station controller 130 may be configured to switch to the CP-OFDM waveform when the measured downlink signal strength stays above the threshold downlink signal strength 132 for a pre-configured second time period 136. In one embodiment, in response to receiving a measurement report 222 having the measured downlink signal strength that equals or is below the threshold downlink signal strength 132, base station controller 130 may start a first timer T1 set to the first time period 134 (e.g., 1000 ms). The base station controller 130 continues to monitor subsequent measurement reports 222 from the UE 110 and checks whether the measured downlink signal strengths received in the subsequent measurement reports 222 stays equal to or below the threshold downlink signal strength 132. If the measured downlink signal strength has stayed equal to or below the threshold downlink signal strength 132 when the first timer T1 expires, base station controller 130 configures the UE 110 to use the DFT-s-OFDM waveform. The first timer T1 is reset any time a measurement report 222 reports a measured downlink signal strength that exceeds the threshold downlink signal strength 132 and is restarted upon receiving a measurement report 222 that reports a measured downlink signal strength that equals or is below the threshold downlink signal strength 132. In an additional or alternative embodiment, in response to receiving a measurement report 222 having the measured downlink signal strength that exceeds the threshold downlink signal strength 132, base station controller 130 may start a second timer T2 set to the second time period 136 (e.g., 1000 ms). The length of the second timer T2 may be same as or different from the first timer T1. The base station controller 130 continues to monitor subsequent measurement reports 222 from the UE 110 and checks whether the measured downlink signal strengths received in the subsequent measurement reports 222 stays above the threshold downlink signal strength 132. If the measured downlink signal strength has stayed above the threshold downlink signal strength 132 when the second timer T2 expires, base station controller 130 configures the UE 110 to use the CP-OFDM waveform. The second timer T2 is reset any time a measurement report 222 reports a measured downlink signal strength that equals or is below the threshold downlink signal strength 132 and is restarted upon receiving a measurement report 222 that reports a measured downlink signal strength that exceeds the threshold downlink signal strength 132. The above procedure may avoid unnecessary switching between waveforms due to momentary errors in measuring the downlink signal 210 by the UE 110.

The base station controller 130 may configure the UE 110 to use the CP-OFDM waveform or the DFT-s-OFDM waveform by commanding the UE 110 to disable or enable respectively transform precoding when generating uplink transmissions to the base station 160. As described above, performing transform precoding of uplink transmissions generates the DFT-s-OFDM waveform and disabling the transform precoding step generates the CP-OFDM waveform. The base station controller 130 may command the UE 110 to disable or enable transform precoding of uplink transmissions by transmitting a configuring message 138 to the UE 110. In one embodiment, the configuring message 138 may include a Radio Resource Control (RRC) message transmitted by the base station 160 to the UE 110. In one embodiment, to enable or disable transform precoding at the UE 110, base station controller 130 may use the transform-precoder field of a Physical Uplink Shared Channel-Config (PUSCH-Config) information element which is transmitted to the UE 110 as part of RRC signaling. For example, to configure the UE 110 to use the DFT-s-OFDM waveform, base station controller 130 may set the transform-precoder field to enabled. Upon receiving an RRC message in which the transform-precoder field of the PUSCH-Config information element is set to enabled, UE 110 starts applying transform precoding when generating subsequent uplink transmissions in order to generate the DFT-s-OFDM waveform. On the other hand to configure the UE 110 to use CP-OFDM, base station controller 130 may set the transform-precoder field to disabled. Upon receiving an RRC message in which the transform-precoder field of the PUSCH-Config information element is set to disabled, UE 110 disables transform precoding when generating subsequent uplink transmissions in order to generate the CP-OFDM waveform.

In an additional or alternative embodiment, to enable or disable transform precoding at the UE 110, base station controller 130 may use msg3-transformPrecoder field of a Random Access Channel-ConfigCommon (RACH-Config-Common) information element which is transmitted to the UE 110 as part of RRC signaling. For example, to configure the UE 110 to use the DFT-s-OFDM waveform, base station controller 130 may set the msg3-transformPrecoder field of the RACH-ConfigCommon information element to enabled. Upon receiving an RRC message in which the msg3-transformPrecoder field of the RACH-ConfigCommon information element is set to enabled, UE 110 starts applying transform precoding when generating subsequent uplink transmissions in order to generate the DFT-s-OFDM waveform. On the other hand to configure the UE 110 to use CP-OFDM, base station controller 130 may set the msg3-transformPrecoder field of the RACH-ConfigCommon information element to disabled. Upon receiving an RRC message in which the msg3-transformPrecoder field of the RACH-ConfigCommon information element is set to disabled, UE 110 disables transform precoding when generating subsequent uplink transmissions in order to generate the CP-OFDM waveform.

Figure 4:
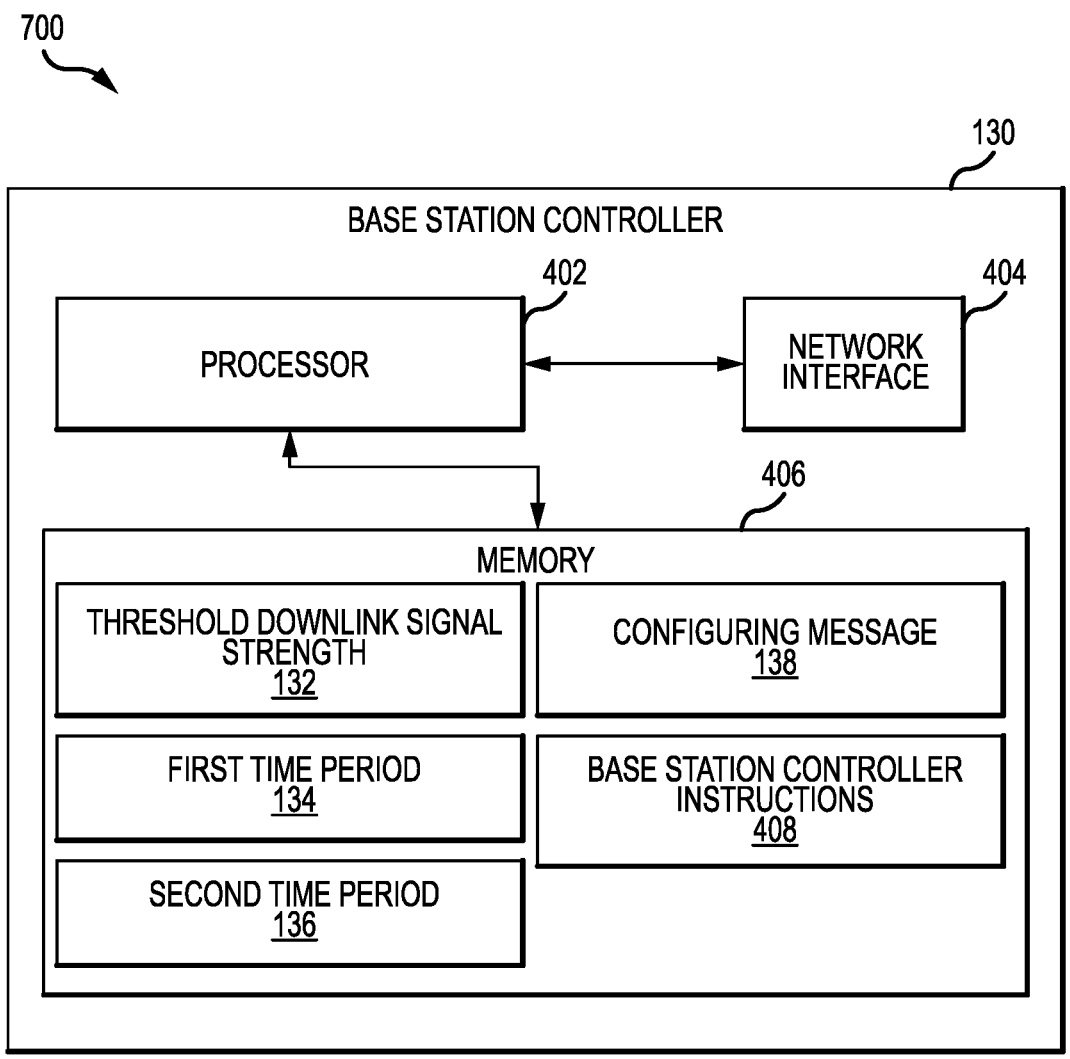
FIG. 4 illustrates an example schematic diagram of the base station controller illustrated in FIG. 1, in accordance with embodiments of the present disclosure.

FIG. 4 illustrates an example schematic diagram of the base station controller 130 illustrated in FIG. 1, in accordance with one or more embodiments of the present disclosure.

Base station controller 130 includes a processor 402, a memory 406, and a network interface 404. The base station controller 130 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute software instructions (e.g., base station controller instructions 408) to implement the base station controller 130. In this way, processor 402 may be a special-purpose computer designed to implement the functions disclosed herein. In one or more embodiments, the base station controller 130 is implemented using logic units, FPGAs, ASICs, DSPs, or any other suitable hardware. The base station controller 130 is configured to operate as described with reference to FIGS. 1-3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store threshold downlink signal strength 132, first time period 134, second time period 136, configuring message 138 and the base station controller instructions 408. The base station controller instructions 408 may include any suitable set of instructions, logic, rules, or code operable to execute the base station controller 130.

The network interface 404 is configured to enable wired and/or wireless communications. The network interface 404 is configured to communicate data between the base station controller 130 and other devices, systems, or domains (e.g. UEs 110, base station tower 120). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each UE 110 may be implemented similar to the base station controller 130. For example, a UE 110 may include a processor and a memory storing instructions to implement the respective functionality of the UE 110 when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A base station comprising:
   a memory that stores a threshold downlink signal strength; and
   at least one processor coupled to the memory and configured to:
   monitor a plurality of measurement reports received from a user equipment (UE), wherein each measurement report includes a measured downlink signal strength of a downlink signal received at the UE;
   compare the measured downlink signal strength received in each measurement report to the threshold downlink signal strength;
   when each of the measured downlink signal strengths received in the measurement reports during a first time period equals or is below the threshold downlink signal strength, configure the UE to transmit using a Discrete Fourier Transform-Spread Orthogonal Frequency Division Multiplexing (DFT-s-OFDM) waveform by transmitting a first message to the UE to enable transform precoding of uplink transmissions by the UE; and
   when each of the measured downlink signal strengths received in the measurement reports during a second time period exceeds the threshold downlink signal strength, configure the UE to transmit using a Cyclic Prefix OFDM (CP-OFDM) waveform by transmitting a second message to the UE to disable the transform precoding of the uplink transmissions by the UE.

2. The base station of claim 1, wherein the first time period starts from a time the base station receives a first measurement report having the measured downlink signal strength that equals or is below the threshold downlink signal strength.

3. The base station of claim 2, wherein the second time period starts from a time the base station receives a second measurement report having the measured downlink signal strength that exceeds the threshold downlink signal strength.

4. The base station of claim 1, wherein the first time period and the second time period have a same value.

5. The base station of claim 1, wherein the threshold downlink signal strength is within a selected range of a downlink signal strength expected at a cell edge associated with the base station.

6. The base station of claim 1, wherein:
   the first message comprises a Radio Resource Control (RRC) message in which a transform-precoder field of a Physical Uplink Shared Channel-Config (PUSCH-Config) information element is set to enabled; and
   the second message comprises the Radio Resource Control (RRC) message in which the transform-precoder field of the PUSCH-Config information element is set to disabled.

7. The base station of claim 1, wherein:
   the first message comprises a Radio Resource Control (RRC) message in which a msg3-transformPrecoder field of a Random Access Channel-ConfigCommon (RACH-ConfigCommon) information element is set to enabled; and
   the second message comprises the Radio Resource Control (RRC) message in which the msg3-transformPrecoder field of the RACH-ConfigCommon information element is set to disabled.

8. The base station of claim 1, wherein:
   the measured downlink signal strength of the downlink signal received at the UE from the base station includes a reference signal received power (RSRP) of the downlink signal; and
   the threshold downlink signal strength includes an RSRP threshold.

9. A method for switching between uplink waveforms, comprising:
   monitoring a plurality of measurement reports received from a user equipment (UE), wherein each measurement report includes a measured downlink signal strength of a downlink signal received at the UE;
   comparing the measured downlink signal strength received in each measurement report to a threshold downlink signal strength;
   in response to determining that each of the measured downlink signal strengths received in the measurement reports during a first time period equals or is below the threshold downlink signal strength, configuring the UE to transmit using a Discrete Fourier Transform-Spread Orthogonal Frequency Division Multiplexing (DFT-s-OFDM) waveform by transmitting a first message to the UE to enable transform precoding of uplink transmissions by the UE; and
   in response to determining that each of the measured downlink signal strengths received in the measurement reports during a second time period exceeds the threshold downlink signal strength, configuring the UE to transmit using a Cyclic Prefix OFDM (CP-OFDM) waveform by transmitting a second message to the UE to disable the transform precoding of the uplink transmissions by the UE.

10. The method of claim 9, wherein:
the first message comprises a Radio Resource Control (RRC) message in which a transform-precoder field of a Physical Uplink Shared Channel-Config (PUSCH-Config) information element is set to enabled; and
the second message comprises the Radio Resource Control (RRC) message in which the transform-precoder field of the PUSCH-Config information element is set to disabled.

11. The method of claim 9, wherein:
the first message comprises a Radio Resource Control (RRC) message in which a msg3-transformPrecoder field of a Random Access Channel-ConfigCommon (RACH-ConfigCommon) information element is set to enabled; and
the second message comprises the Radio Resource Control (RRC) message in which the msg3-transformPrecoder field of the RACH-ConfigCommon information element is set to disabled.

12. A non-transitory computer-readable medium storing instructions which when executed by a processor cause the processor to:
monitor a plurality of measurement reports received from a user equipment (UE), wherein each measurement report includes a measured downlink signal strength of a downlink signal received at the UE;
compare the measured downlink signal strength received in each measurement report to a threshold downlink signal strength;
when each of the measured downlink signal strengths received in the measurement reports during a first time period equals or is below the threshold downlink signal strength, configure the UE to transmit using a Discrete Fourier Transform-Spread Orthogonal Frequency Division Multiplexing (DFT-s-OFDM) waveform by transmitting a first message to the UE to enable transform precoding of uplink transmissions by the UE; and
when each of the measured downlink signal strengths received in the measurement reports during a second time period exceeds the threshold downlink signal strength, configure the UE to transmit using a Cyclic Prefix OFDM (CP-OFDM) waveform by transmitting a second message to the UE to disable the transform precoding of the uplink transmissions by the UE.

13. The non-transitory computer-readable medium of claim 12, wherein:
the first message comprises a Radio Resource Control (RRC) message in which a transform-precoder field of a Physical Uplink Shared Channel-Config (PUSCH-Config) information element is set to enabled; and
the second message comprises the Radio Resource Control (RRC) message in which the transform-precoder field of the PUSCH-Config information element is set to disabled.

14. The non-transitory computer-readable medium of claim 12, wherein:
the first message comprises a Radio Resource Control (RRC) message in which a msg3-transformPrecoder field of a Random Access Channel-ConfigCommon (RACH-ConfigCommon) information element is set to enabled; and
the second message comprises the Radio Resource Control (RRC) message in which the msg3-transformPrecoder field of the RACH-ConfigCommon information element is set to disabled.

* * * * *